US009970807B2

(12) United States Patent
Thomas

(10) Patent No.: US 9,970,807 B2
(45) Date of Patent: May 15, 2018

(54) CLIMATE CONTROL DEVICE WITH IMPROVED LIQUID LEVEL SENSING

(71) Applicant: Essick Air Products, Inc., Little Rock, AR (US)

(72) Inventor: Scott Thomas, Greenbrier, AR (US)

(73) Assignee: Essick Air Products, Inc., Little Rock, AR (US)

( * ) Notice: Subject to any disclaimer, the term of this patent is extended or adjusted under 35 U.S.C. 154(b) by 0 days. days.

(21) Appl. No.: 15/416,320

(22) Filed: Jan. 26, 2017

(65) Prior Publication Data

US 2017/0219410 A1    Aug. 3, 2017

Related U.S. Application Data

(60) Provisional application No. 62/288,119, filed on Jan. 28, 2016.

(51) Int. Cl.
*G08B 21/00* (2006.01)
*G01F 23/296* (2006.01)
*F24F 11/00* (2018.01)

(52) U.S. Cl.
CPC ........ *G01F 23/2962* (2013.01); *F24F 11/001* (2013.01); *F24F 11/0086* (2013.01); *F24F 2011/0052* (2013.01); *F24F 2011/0091* (2013.01)

(58) Field of Classification Search
CPC .......................... G01F 23/2962; F24F 11/0086
USPC ....................... 340/618; 141/83, 94, 198, 360
See application file for complete search history.

(56) References Cited

U.S. PATENT DOCUMENTS

| 3,193,261 | A | 7/1965 | Nesbitt |
| 3,253,820 | A | 5/1966 | Seil |
| 4,563,313 | A | 1/1986 | Tsuaki |
| 6,237,899 | B1 | 5/2001 | Offir et al. |
| 6,308,939 | B2 | 10/2001 | Offir et al. |

(Continued)

FOREIGN PATENT DOCUMENTS

JP    62194147 A    8/1987

OTHER PUBLICATIONS

AIR-O-SWISS Ultrasonic Humidifier 7142; http://www.iallergy.com/product_info.php?products_id=837, Jun. 2015, 3 pages.

(Continued)

*Primary Examiner* — Tai T Nguyen
(74) *Attorney, Agent, or Firm* — RatnerPrestia

(57) ABSTRACT

Climate control devices and methods are disclosed. A climate control device includes a housing, an ultrasonic emitter, an ultrasonic receiver, and a controller. The housing defines a receptacle for receiving liquid. The ultrasonic emitter is positioned to emit an ultrasonic wave toward a surface of the liquid received in the receptacle. The ultrasonic receiver is positioned to receive the ultrasonic wave after the ultrasonic wave reflects off of the surface of the liquid. The controller is configured to provide a liquid level indication based on the ultrasonic wave received by the ultrasonic receiver. A climate control method includes receiving liquid in the receptacle, emitting an ultrasonic wave toward a surface of the liquid in the receptacle, receiving at least a portion of the ultrasonic wave after the ultrasonic wave reflects off of the surface of the liquid, and providing a liquid level indication based on the received ultrasonic wave.

18 Claims, 5 Drawing Sheets

(56) References Cited

U.S. PATENT DOCUMENTS

| | | | |
|---|---|---|---|
| 6,523,810 B2 | 2/2003 | Offir et al. | |
| 6,622,993 B2 | 9/2003 | Mulvaney | |
| 6,769,671 B2 | 8/2004 | Rhea et al. | |
| 6,789,585 B1* | 9/2004 | Janke | F25D 23/126 |
| | | | 141/198 |
| 7,510,170 B2 | 3/2009 | Huang | |
| 7,661,448 B2* | 2/2010 | Kim | B67D 1/0005 |
| | | | 141/360 |
| 7,730,830 B2 | 6/2010 | Kaneko et al. | |
| 8,296,993 B2 | 10/2012 | Modlin et al. | |
| 8,827,247 B2 | 9/2014 | Kanel et al. | |
| 2011/0061415 A1* | 3/2011 | Ward | F04B 49/04 |
| | | | 62/291 |
| 2013/0000337 A1* | 1/2013 | Krause | B67D 1/0888 |
| | | | 62/177 |
| 2015/0176880 A1* | 6/2015 | Ochiai | F25B 49/005 |
| | | | 62/115 |

OTHER PUBLICATIONS

Crane Digital Utrasonic Cool Mist/Warm Mist humidifier Instruction Manual; Item #EE-8064, Model #SH8201, 12 pages.
Crane Drop Shape Ultrasonic Cool Mist Humidifier with 2.3 Gallon output per day; http://www.amazon.com/Crane-Ultrasonic-Humidifier-Gallon-output/dp/B005PK7RW4, Jun. 2015, 7 pages.
FLOWLINE Marine Life Science Tank Level Measurement; http://www.flowline.com/application_success/marine-life- science-tank-level-measurement, Jun. 2015, 1 page.

* cited by examiner

CLIMATE CONTROL DEVICE WITH IMPROVED LIQUID LEVEL SENSING

CROSS-REFERENCE TO RELATED APPLICATIONS

The present application claims priority to U.S. Patent Application No. 62/288,119, entitled "CLIMATE CONTROL DEVICE WITH IMPROVED LIQUID LEVEL SENSING," filed Jan. 28, 2016, the contents of which are incorporated herein by reference in their entirety.

FIELD OF THE INVENTION

This invention relates generally to climate control devices, and more particularly to liquid level sensing in climate control devices.

BACKGROUND OF THE INVENTION

Climate control devices, such as evaporative coolers or humidifiers, may be used to cool or humidify air by causing the air to flow through a dampened evaporative medium. The effectiveness of the climate control may depend in part on the ability of the device to manage the evaporation of liquid (e.g. water) into the air flowing through the device. The user of the climate control device may be relied on to maintain an adequate supply of liquid, and to ensure that the evaporative medium is performing adequately. Accordingly, improvements in climate control devices are desired that improve the efficiency of the device and simplify the tasks for which the user is required.

SUMMARY OF THE INVENTION

Aspects of the present invention relate to climate control devices and methods.

In accordance with one aspect of the present invention, a climate control device is disclosed. The climate control device includes a housing, an ultrasonic emitter, an ultrasonic receiver, and a controller. The housing defines a receptacle for receiving liquid. The ultrasonic emitter is positioned to emit an ultrasonic wave toward a surface of the liquid received in the receptacle. The ultrasonic receiver is positioned to receive at least a portion of the ultrasonic wave after the ultrasonic wave reflects off of the surface of the liquid. The controller is electrically coupled with the ultrasonic receiver. The controller is configured to provide a liquid level indication based on the ultrasonic wave received by the ultrasonic receiver.

In accordance with another aspect of the present invention, a climate control method is disclosed. The method includes receiving liquid in a receptacle of a climate control device, emitting an ultrasonic wave toward a surface of the liquid in the receptacle, receiving at least a portion of the ultrasonic wave after the ultrasonic wave reflects off of the surface of the liquid, and providing a liquid level indication based on the received ultrasonic wave.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

Figure 1:
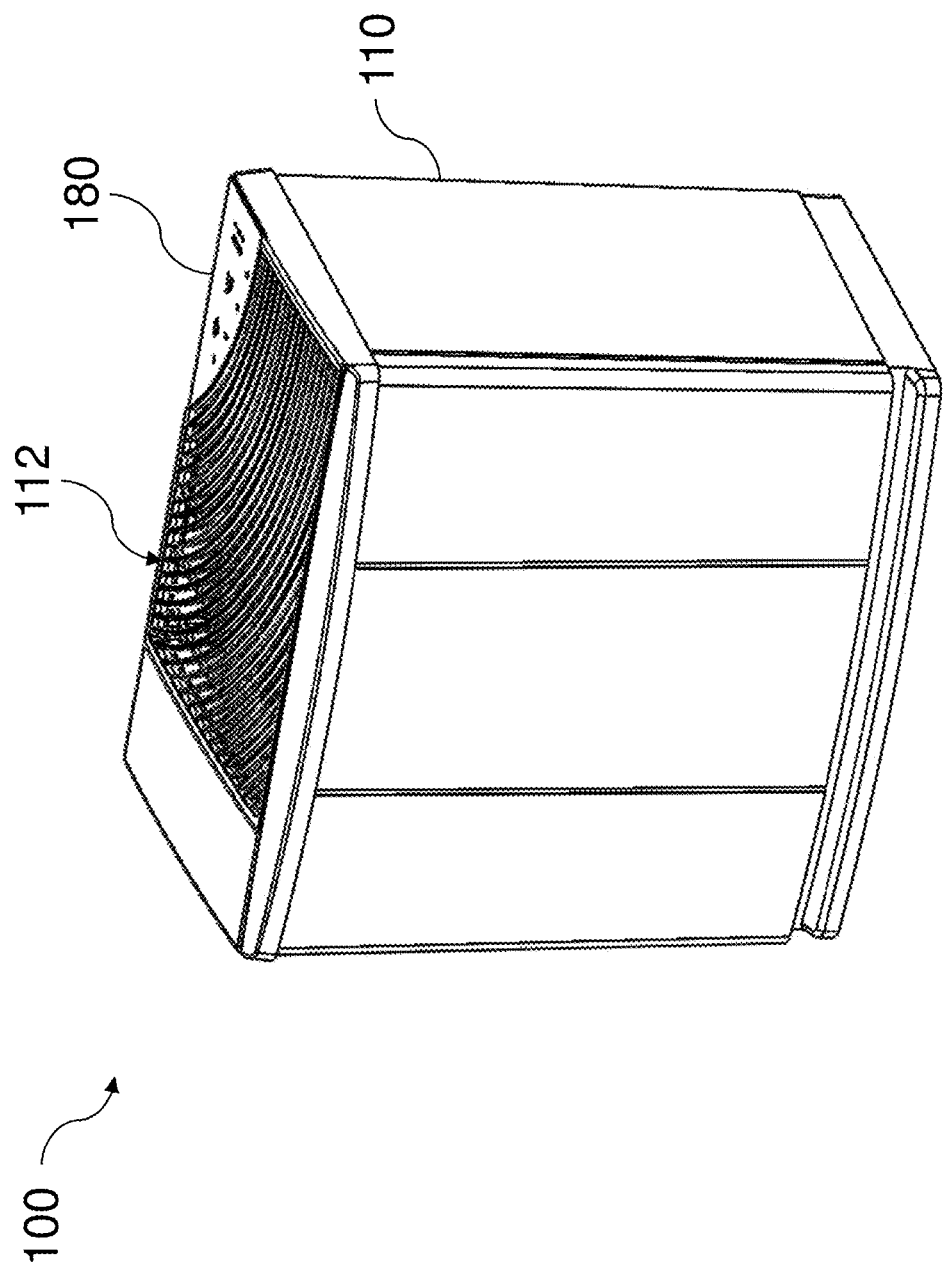
FIG. 1 is a diagram showing a perspective view of an exemplary climate control device in accordance with aspects of the present invention.

Although the invention is illustrated and described herein with reference to specific embodiments, the invention is not intended to be limited to the details shown. Rather, various modifications may be made in the details within the scope and range of equivalents of the claims and without departing from the invention.

The invention is best understood from the following detailed description when read in connection with the accompanying drawing figures, which show exemplary embodiments of the invention selected for illustrative purposes. The invention will be described with reference to the figures. Such figures are intended to be illustrative rather than limiting and are included herewith to facilitate the explanation of the present invention.

As an overview, FIGS. 1-4 show an exemplary embodiment of a climate control device 100 in accordance with an aspect of the present invention. Climate control device 100 may be, for example, an evaporative cooler or a humidifier. Generally, climate control device 100 includes a housing 110, an ultrasonic liquid level sensor 140, and a controller 170. Additional details of climate control device 100 will be provided herein.

Housing 110 defines an interior region of climate control device 100. Housing 110 defines an air inlet 112 for permitting air flow into the interior region of climate control device 100, and an air outlet 114 for permitting air flow out of the interior region of climate control device 100. During operation, climate control device 100 draws air in through air inlet 112, cools and/or humidifies the air within the interior region of housing 110 (depending on the desired operation of climate control device 100), and discharges air out through air outlet 114 into the environment being climate controlled.

Climate control device 100 may further include a fan for generating air flow through housing 110. The fan is connected to a motor which is configured to operate the fan at one or more speeds for generating a desired air flow. Suitable fans for use in climate control device 100 will be known to one of ordinary skill in the art from the description herein, and may be selected, for example, based on a desired air flow through climate control device 100 or on an intended size of housing 110.

Figure 2:
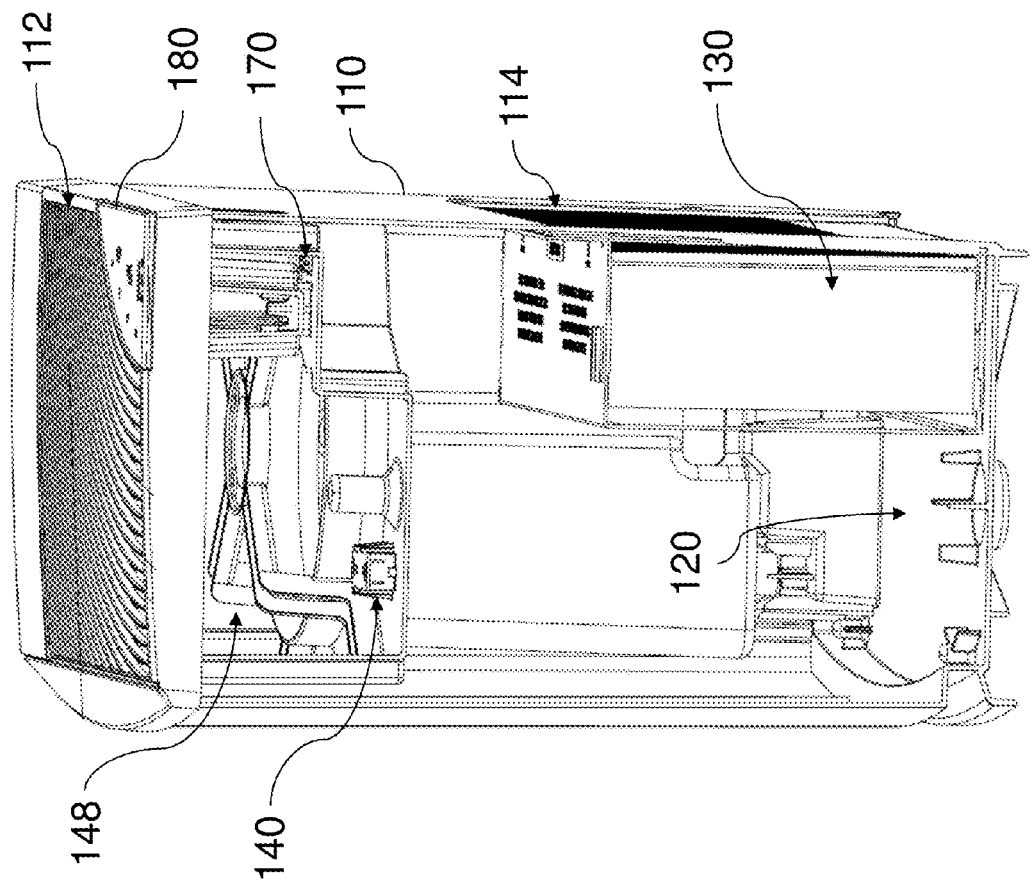
FIG. 2 is a diagram showing a cut-away view of the climate control device of FIG. 1.

Climate control device 100 utilizes liquid (e.g. water) during operation. Accordingly, housing 110 defines a receptacle 120 in the interior region of climate control device 100 for receiving the liquid. Receptacle 120 may be defined in part by the inside surface of outer walls of housing 110. Alternatively, housing 110 may include a separate structure defining receptacle 120 such as, for example, a basin (not shown) positioned in the interior region of housing 110. In an exemplary embodiment, receptacle 120 is formed in a bottom portion of housing 110, as illustrated in FIG. 2. In that exemplary embodiment, receptacle 120 may extend up to the bottom edge of air outlet 114, so that water does not leak out of air outlet 114.

Housing 110 may further include a filling access port for allowing a user to provide liquid to the interior region of housing 110 for filling receptacle 120. A user of climate control device 100 may pour liquid through the filling access port. Alternatively, a user may place one or more liquid containers within housing 110 by way of the filling access port. Once received in housing 110, the liquid containers may be configured (e.g., through an actuatable valve) to release their liquid into receptacle 120 in housing 110. Liquid received in receptacle 120 may be used to cool and/or humidify the air flowing through climate control device 100 by the process of evaporation. The evaporative cooling process of climate control device 100 will be described herein.

Housing 110 may be formed from a single integral piece of material, or from multiple pieces of material. Suitable materials for forming housing 110 include, for example, acrylonitrile butadiene styrene (ABS), high-impact polystyrene (HIPS), polypropylene, polystyrene, and other suitable polymers or plastics. Other suitable materials for forming housing 110 will be known to one of ordinary skill in the art from the description herein. Housing 110 may be formed, for example, by injection molding.

Climate control device 100 includes an evaporative medium 130 positioned within housing 110. Evaporative medium 130 is positioned to contact or receive liquid in receptacle 120, and provides a plurality of connected surfaces from which the liquid may evaporate into the air flowing through climate control device 100. Evaporative medium 130 may be positioned covering air inlet 112 or air outlet 114 in order to help maximize the amount of liquid on evaporative medium 130 that evaporates into the air.

In an exemplary embodiment, evaporative medium 130 may have a portion positioned within receptacle 120. In this embodiment, the medium operates by wicking to draw liquid from receptacle 120 into evaporative medium 130 for evaporation during operation of climate control device 100. In an alternative or additional exemplary embodiment, liquid in receptacle 120 may be pumped over or onto evaporative medium 130, as set forth below.

Certain embodiments of climate control device 100, such as embodiments providing evaporative cooling, may include a pump. In such embodiments, the pump may be disposed at least partially within receptacle 120. The pump is configured to pump liquid out of receptacle 120. In an exemplary embodiment, the pump is at least partially submerged when liquid is received within receptacle 120. The pump has an inlet positioned to contact liquid received in receptacle 120. The pump is operable to pump the liquid out of receptacle 120 during operation of climate control device 100 (e.g., to an evaporative medium). Suitable pumps will be known by one of ordinary skill in the art from the description herein.

Figure 3:
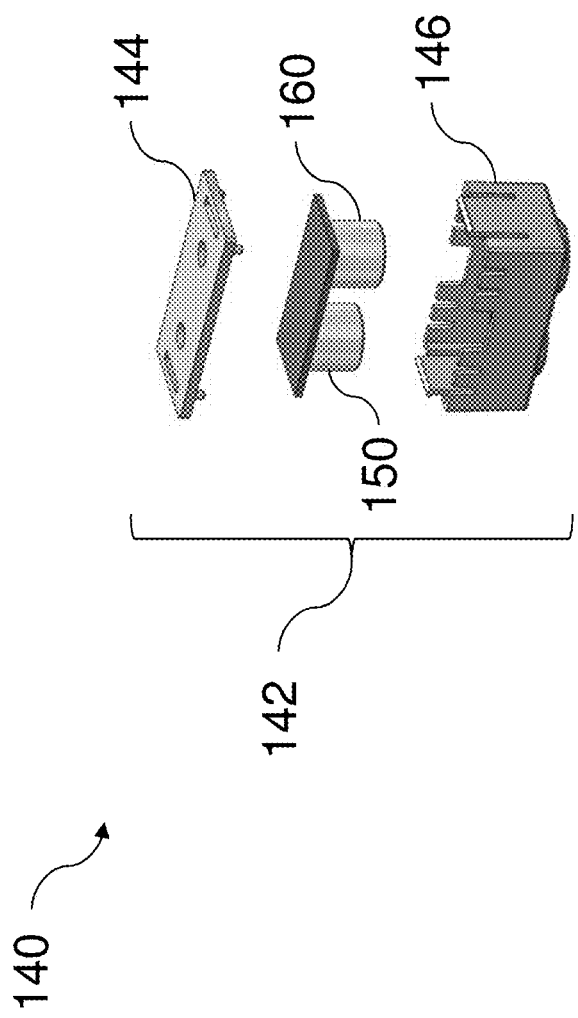
FIG. 3 is a diagram showing an exploded view of an exemplary sensor of the climate control device of FIG. 1.

Levels of liquid received in receptacle 120 can change, due to for example, evaporation, Ultrasonic liquid level sensor 140 senses the level of liquid in receptacle 120. As shown in FIG. 3, sensor 140 includes an ultrasonic emitter 150 and an ultrasonic receiver 160. Ultrasonic emitter 150 is positioned to emit an ultrasonic wave toward a surface of the liquid received in receptacle 120. Ultrasonic receiver 160 is positioned to receive at least a portion of the ultrasonic wave after the ultrasonic wave reflects off of the surface of the liquid received in receptacle 120. Suitable devices containing an ultrasonic emitter and ultrasonic receiver usable in accordance with the present invention include, for example, the HC-SR04 ultrasonic distance sensor.

In an exemplary embodiment, ultrasonic emitter 150 is positioned to emit the ultrasonic wave in a direction substantially orthogonal to the surface of the liquid received in receptacle 120. For example, ultrasonic sensor 140 may be positioned directly above receptacle 120, such that ultrasonic emitter 150 faces downward toward the surface of liquid received in receptacle 120. The ultrasonic wave then reflects off the surface of the liquid back toward ultrasonic sensor 140, where it is received by ultrasonic receiver 160.

As shown in FIGS. 2 and 3, ultrasonic emitter 150 and ultrasonic receiver 160 can both be accommodated within a single sensor housing 142. Sensor housing 142 has an upper portion 144 and a lower portion 146. Lower portion 146 may include one or more ports to enable the emission and receipt of ultrasonic waves into and/or out of housing 142. In an exemplary embodiment, sensor housing 142 is positioned in a chamber 148 of housing 110 separate from receptacle 120. This separate chamber 148 may be desirable to minimize or eliminate the possibility of damage to ultrasonic sensor 140 by the liquid received in receptacle 120. Alternatively, sensor housing 142 may be positioned in the same section or chamber of housing 110 as receptacle 120.

Controller 170 is electrically coupled with ultrasonic sensor 140. Controller 170 provides a signal to ultrasonic emitter 150 to emit the ultrasonic wave toward the surface of the liquid. Likewise, controller 170 receives a signal from ultrasonic receiver 160 signaling receipt of the ultrasonic wave reflected off of the surface of the liquid. Controller 170 is configured to provide an indication of the liquid level in receptacle 120 based on the ultrasonic wave received by ultrasonic receiver 160, in accordance with the operation of climate control device 100 described in greater detail below.

Figure 4:
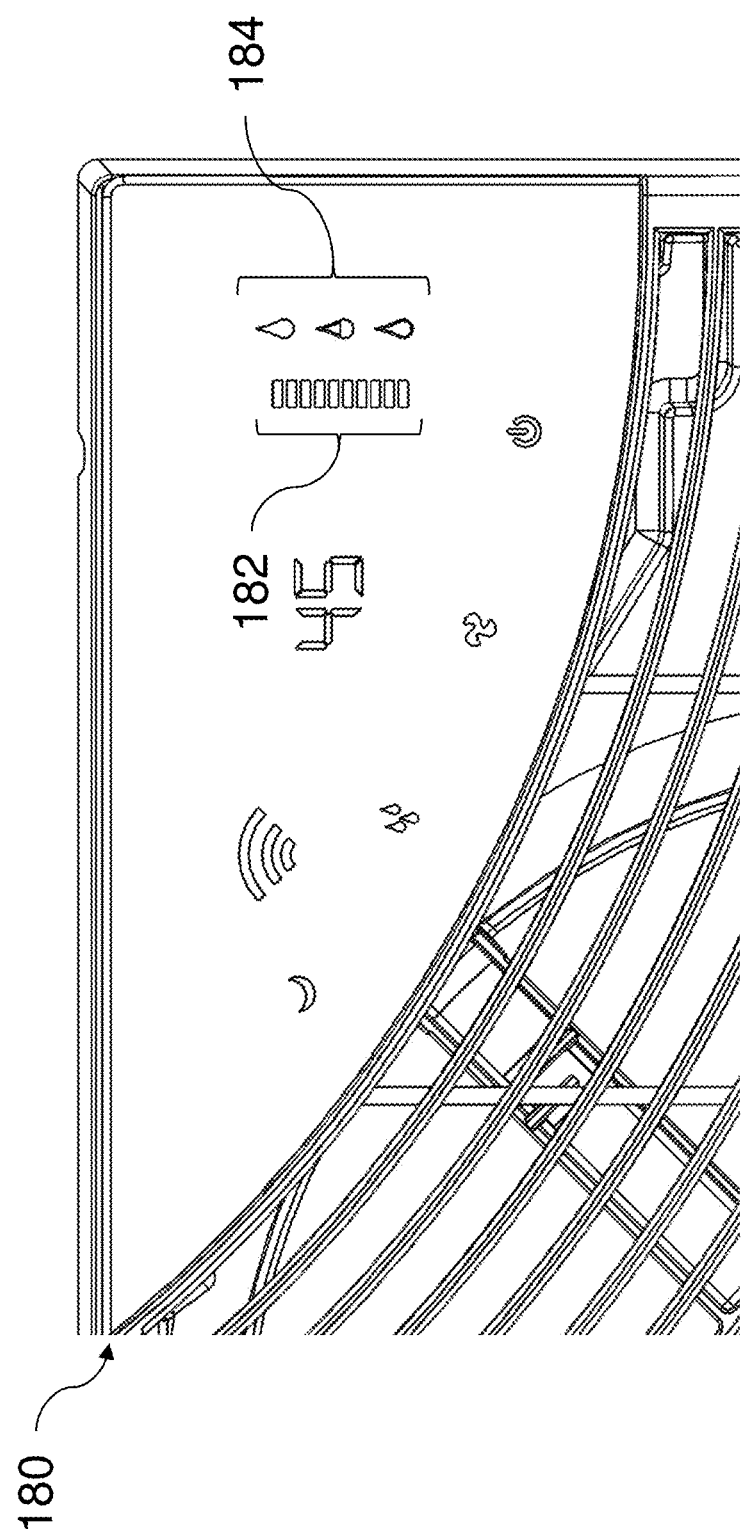
FIG. 4 is a diagram showing a top view of an exemplary display of the climate control device of FIG. 1.

Climate control device 100 may further include a display 180, as shown in FIG. 4. Display 180 is electrically coupled with controller 170. Controller 170 may provide a liquid level indication to a user of climate control device 100 using display 180. In an exemplary embodiment, display 180 includes a plurality of separate lights 182. Lights 182 may be, for example, a series of light emitting diodes (LEDS). In this embodiment, controller 170 illuminates a number of the lights 182 based on the level of liquid in receptacle 120. Controller 170 may illuminate more lights to indicate a higher liquid level, and illuminate fewer lights to indicate a lower liquid level. As shown in FIG. 4, display 180 may include liquid level diagrams 184 adjacent lights 182 to clarify to the user of climate control device 100 the meaning of the liquid level indications provided by controller 170. Display 180 may further include indications to the user of a current status of climate control device 100 (e.g., an on/off/standby status indicator), a current setting of climate control device (e.g., a current temperature or humidity or setpoint temperature or humidity), or a current mode of climate control device 100 (e.g., a fan speed indicator and/or a silent mode indicator). Still further, display 180 may provide an indication of the current efficiency of evaporative medium 130, as calculated by controller 1780 herein.

Alternatively or additionally, climate control device 100 may include an alarm electrically coupled with controller 170. Controller 170 may be configured to activate the alarm to provide a liquid level indication. For example, controller 170 may be configured to activate the alarm when a time between emission of the ultrasonic wave from ultrasonic emitter 150 and receipt of the ultrasonic wave by ultrasonic receiver 160 exceeds a predetermined value. The predetermined value may be determined based on a level of liquid in receptacle 120 determined to be undesirably low or ineffective for operation of climate control device 100. In such an embodiment, the predetermined value may be the length of time needed for the ultrasonic wave to reach the liquid level and reflect back to ultrasonic sensor 140 when the liquid in receptacle 120 reaches an undesirably low level.

In an exemplary embodiment, the alarm may take the form of a low liquid level indicator on display 180. Alternatively or additionally, the alarm may include an audible alarm generated by a loudspeaker for alerting the user of climate control device 100 of the need to refill receptacle 120. In still another embodiment, controller 170 may be connected to a wireless transceiver, and the alarm may be sent remotely or wirelessly to a user. The wireless transceiver may be operable to send information wirelessly to the user via the internet, near field communication (NFC), or other conventional wireless communications protocols.

Climate control device 100 may further include a memory electrically coupled with controller 170 for storage of data relating to operation of climate control device 100. Climate control device 100 may be programmed to store data in the memory relating to the change in liquid level sensed using ultrasonic sensor 140 over a period of time (e.g., a period of operation of climate control device 100).

In an exemplary embodiment, climate control device 100 stores information regarding a rate of decrease of the liquid level in receptacle 120. The rate of decrease may be dependent in part on the volume of air flow through climate control device 100 and/or on the absorptiveness of evaporative medium 130 in climate control device 100. Thus, the rate of decrease of liquid level may be used to assess absorptiveness (and thus effectiveness) of evaporative medium 130 in climate control device 100. In this embodiment, controller 170 may be configured to provide an evaporative medium replacement indication when the rate of decrease of the liquid level in receptacle 120 falls below a predetermined value, indicative of a lack of absorptiveness of evaporative medium 130 in climate control device 100. The indication may be a visual indication (provided with display 180), an audible indication, or may be an indication sent via the wireless transceiver, such as a Short Message Service (SMS) indication.

In an exemplary embodiment, an amount of liquid level decrease in receptacle 120 may be predetermined for a particular operating mode of climate control device 100. For example, the amount of liquid level decrease using new evaporative medium and operating on a high fan speed may be determined to be one inch per hour. This amount of liquid level decrease may be pro-rated for lower fan speeds of the climate control device. During operation of climate control device 100, the amount of liquid level decrease over a time period (e.g. one hour) may be compared to this predetermined, ideal liquid level decrease. For example, if during a one hour period, the liquid level decreases by ¾ inches, then climate control device 100 may be said to be operating at 75% efficiency. When this efficiency drops below a predetermined value (e.g., 60%), then controller 170 may be configured to provide the evaporative medium replacement indication, as described above.

In another embodiment, the rate of liquid level decrease in receptacle 120 may be used by controller 170 to determine an estimated remaining run-time of climate control device 100. The amount of liquid level decrease over a time period (e.g., one hour) may be compared to the liquid level remaining in receptacle 120 in order to determine how many hours of operation at that same rate of liquid level decrease would result in receptacle 120 being empty. Controller 170 may also be configured to provide an indication of remaining run-time to the user. When this run-time drops below a predetermined value (e.g., two hours), then controller 170 may be configured to provide a refill alert to the user. As with the evaporative medium replacement indication, the refill alert may be a visual indication (provided with display 180), an audible indication, or may be an alert sent via the wireless transceiver, such as a Short Message Service (SMS) alert.

In embodiments of climate control device 100 including a pump, controller 170 may further be configured to activate or deactivate the pump based on the ultrasonic wave received by ultrasonic receiver 160. Controller 170 may activate or deactivate the pump in conjunction with the determination of the liquid level in receptacle 120. For example, when controller 170 determines that there is a low liquid level in receptacle 120 (e.g., when a time between emission of the ultrasonic wave from ultrasonic emitter 150 and receipt of the ultrasonic wave by ultrasonic receiver 160 exceeds a predetermined value, as described above), controller 170 may be configured to deactivate the pump. For another example, when controller 170 determines that receptacle 120 has been refilled (e.g., when a time between emission of the ultrasonic wave from ultrasonic emitter 150 and receipt of the ultrasonic wave by ultrasonic receiver 160 falls below a different predetermined value), controller 170 may be configured to activate the pump. Automatic deactivation of the pump using controller 170 may be desirable in order to avoid potential damage to or unnecessary operation of the pump caused, for example, by operation in an empty receptacle 120.

Operation of climate control device 100 will now be described. In an exemplary embodiment, a user of climate control device 100 turns on the fan, which causes air flow into housing 110 via air inlet 112, through evaporative medium 130, and out through air outlet 114. During this operation, liquid is contained within receptacle 120. Evaporative medium 130 receives the liquid either through wicking from receptacle 120 or through pumping out of receptacle 120. As air flows through evaporative medium 130, the liquid on evaporative medium 130 evaporates, thereby humidifying and/or cooling the air. A user may adjust the speed of the fan to generate a desired flow of air and/or amount of cooling and/or humidifying.

Ultrasonic liquid level sensor 140 senses the level of liquid in receptacle 120 during operation of climate control device 100. Sensor 140 may sense the liquid level continuously or periodically.

To sense the liquid level, an ultrasonic wave is emitted by ultrasonic emitter 150 toward the liquid in receptacle 120. The ultrasonic wave at least partially reflects off the surface of this liquid, and is subsequently received by ultrasonic receiver 160. Ultrasonic receiver 160 sends a signal to controller 170, which determines the length of time between emission and receipt of the ultrasonic wave. From this length of time, controller 170 is operable to calculate the level of liquid in receptacle 120.

In an exemplary embodiment, sensor 140 takes a predetermined number (e.g. ten) of such measurements over a predetermined period of time (e.g., twenty seconds). These measurement periods may occur consecutively (such that the predetermined periods of time occur one after another) or may be spaced apart (such that the predetermined periods of time are spaced apart. In a more preferred embodiment, the predetermined periods of time are spaced apart (e.g., such that the ten measurements are obtained in a twenty second interval every six minutes). The predetermined number of measurements are then averaged. This average may then be used to calculate the liquid level in receptacle 120 as described above.

Controller 170 is configured to indicate the liquid level in receptacle 120 to the user during operation of climate control device 100. Controller 170 may provide the liquid level indication using a plurality of lights 182 on a display 180. Alternatively or additionally, controller 170 may provide an audible or visual alarm when the level of liquid in receptacle 120 is low. Additionally, controller 170 may be configured to automatically deactivate a pump (when present) when the level of liquid in receptacle 120 is low.

Figure 5:
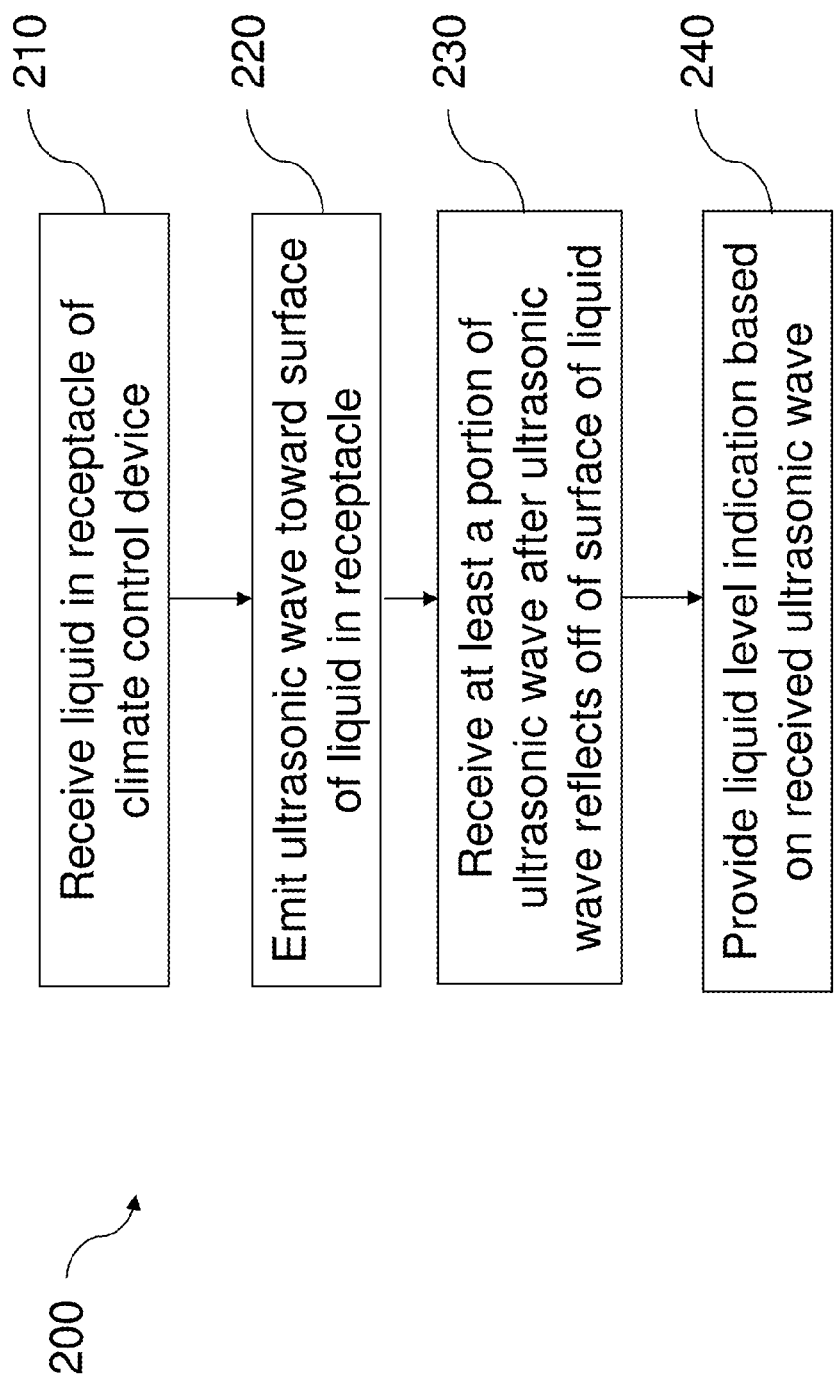
FIG. 5 is a flowchart showing an exemplary climate control method in accordance with aspects of the present invention.

FIG. 5 shows an exemplary embodiment of a climate control method 200 in accordance with an aspect of the present invention. Climate control method 200 may be performed, for example, by an evaporative cooler or a humidifier. Generally, climate control method 200 includes receiving liquid, emitting an ultrasonic wave, receiving the ultrasonic wave reflected off of the surface of the liquid, and providing a liquid level indication. Additional details of climate control method 200 will be described herein with reference to the components of climate control device 100.

In step 210, liquid is received in a receptacle of a climate control device. In an exemplary embodiment, water is received in receptacle 120 of climate control device 100. The user of climate control device may fill or refill receptacle 120 by inserting a water container into housing 110 via a filler access port provided in housing 110.

In step 220, an ultrasonic wave is emitted toward a surface of the liquid in the receptacle. In an exemplary embodiment, ultrasonic emitter 150 emits an ultrasonic wave toward receptacle 120. Ultrasonic emitter 150 preferably emits the ultrasonic wave in a direction substantially orthogonal to the surface of the liquid in receptacle 120.

In step 230, the ultrasonic wave is received from the surface of the liquid in the receptacle. In an exemplary embodiment, at least a portion of the ultrasonic wave reflects off the surface of the liquid in receptacle 120, and is received by ultrasonic receiver 160.

In step 240, a liquid level indication is provided. In an exemplary embodiment, controller 170 provides a liquid level indication based on the ultrasonic wave received by ultrasonic receiver 160. Controller 170 may provide the liquid level indication on display 180, for example, by illuminating a number of lights 182 based on the level of the liquid in receptacle 120. Controller 170 may illuminate a greater number of lights 182 when the liquid level is higher, and a lesser number of lights 182 when the liquid level is lower, such that the number of illuminated lights generally corresponds to the amount of liquid in receptacle 120. Controller 170 may alternatively or additionally provide the liquid level indication in the form of an audible or visible alarm generated when a time between steps 220 and 230 exceeds a predetermined value.

Method 200 is not limited to the above-described steps, but may include alternative or additional steps as would be understood by one of ordinary skill in the art from the description herein.

For example, method 200 may include storing data in a memory relating to a change in liquid level over a period of time. The stored data may be used to monitor a rate of increase or decrease of the liquid level in the receptacle. In an exemplary embodiment, controller 170 provides an evaporative medium replacement indication when the rate of decrease of the liquid level falls below a predetermined value, indicative of a lack of absorptiveness of evaporative medium 130 in climate control device 100.

For another example, method 200 may include pumping liquid out of the receptacle. In an exemplary embodiment, controller 170 controls the operation of a pump based on the time between steps 220 and 230. Controller 170 may deactivate the pump when the time between steps 220 and 230 indicates that the liquid level in receptacle 120 is low, and may activate the pump when the time between steps 220 and 230 indicates that receptacle 120 has been refilled with liquid.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A climate control device comprising:
a housing defining a receptacle for receiving liquid;
an ultrasonic emitter positioned to emit an ultrasonic wave toward a surface of the liquid received in the receptacle;
an ultrasonic receiver positioned to receive at least a portion of the ultrasonic wave after the ultrasonic wave reflects off of the surface of the liquid; and
a controller electrically coupled with the ultrasonic receiver, the controller configured to:
provide a liquid level indication based on the ultrasonic wave received by the ultrasonic receiver;
monitor a rate of change of the liquid level over time; and
provide an evaporative medium replacement indication when the rate of change of the liquid level over time falls below a predetermined value.

2. The climate control device of claim 1, wherein the ultrasonic emitter is positioned to emit the ultrasonic wave in a direction substantially orthogonal to the surface of the liquid received in the receptacle.

3. The climate control device of claim 2, wherein the ultrasonic emitter and the ultrasonic receiver are both accommodated within a single ultrasonic sensor housing.

4. The climate control device of claim 3, wherein the single ultrasonic sensor housing is positioned in a chamber separate from the receptacle for receiving the liquid.

5. The climate control device of claim 1, further comprising a display electrically coupled with the controller, wherein the controller is configured to provide the liquid level indication with the display.

6. The climate control device of claim 5, wherein the display includes a plurality of separate lights, and the liquid level indication comprises illuminating a number of the plurality of lights based on a level of the liquid in the receptacle.

7. The climate control device of claim 1, further comprising an alarm electrically coupled to the controller, wherein the controller is configured to activate the alarm to provide the liquid level indication.

8. The climate control device of claim 7, wherein the controller is configured to activate the alarm when a time between emission and receipt of the ultrasonic wave exceeds a predetermined value.

9. The climate control device of claim 7, wherein the alarm is an audible alarm.

10. The climate control device of claim 1, further comprising a memory electrically coupled with the controller, wherein the controller is programmed to store data relating to the rate of change of the liquid level over a period or time in the memory.

11. The climate control device of claim 1, wherein the climate control device is an evaporative cooler.

12. The climate control device of claim 1, wherein the climate control device is a humidifier.

13. A climate control method comprising:
   receiving liquid in a receptacle of a climate control device;
   emitting an ultrasonic wave toward a surface of the liquid in the receptacle;
   receiving at least a portion of the ultrasonic wave after the ultrasonic wave reflects off of the surface of the liquid;
   providing a liquid level indication based on the received ultrasonic wave;
   monitoring a rate of change of the liquid level over time; and
   providing an evaporative medium replacement indication when the rate of change of the liquid level over time falls below a predetermined value.

14. The climate control method of claim 13, wherein the emitting step comprises emitting the ultrasonic wave in a direction substantially orthogonal to the surface of the liquid received in the receptacle.

15. The climate control method of claim 13, wherein the providing step comprises providing the liquid level indication with a display.

16. The climate control method of claim 15, wherein the providing step comprises illuminating a number of separate lights based on a level of the liquid in the receptacle.

17. The climate control method of claim 13, wherein the providing step comprises generating an alarm when a time between the ultrasonic emitting and receiving steps exceeds a predetermined value.

18. The climate control method of claim 13, wherein the monitoring comprises storing data relating to the rate of change of the liquid level over a period of time.

* * * * *